US007132939B2

(12) United States Patent
Tyndall et al.

(10) Patent No.: US 7,132,939 B2
(45) Date of Patent: Nov. 7, 2006

(54) INTEGRATED SELF-POWERED TIRE REVOLUTION COUNTER

(75) Inventors: Patrick A. Tyndall, Simpsonville, SC (US); George Phillips O'Brien, Piedmont, SC (US); Timothy R. Tedrow, Simpsonville, SC (US)

(73) Assignee: Michelin Recherche et Technique S.A. (CH)

( * ) Notice: Subject to any disclaimer, the term of this patent is extended or adjusted under 35 U.S.C. 154(b) by 91 days.

(21) Appl. No.: 10/886,219

(22) Filed: Jul. 7, 2004

(65) Prior Publication Data
US 2006/0006991 A1   Jan. 12, 2006

(51) Int. Cl.
B60C 23/00   (2006.01)
(52) U.S. Cl. ............ 340/447; 340/442; 340/444; 340/445; 340/448; 377/15; 377/16; 377/24.1
(58) Field of Classification Search ......... 340/442, 340/444, 447, 448, 445, 446; 377/15, 16, 377/24.1; 701/1, 53; 73/146, 146.2, 146.8
See application file for complete search history.

(56) References Cited

U.S. PATENT DOCUMENTS

| 3,760,351 | A |   | 9/1973 | Thomas |
|---|---|---|---|---|
| 4,061,200 | A |   | 12/1977 | Thompson |
| 4,510,484 | A |   | 4/1985 | Snyder |
| 4,862,486 | A |   | 8/1989 | Wing et al. |
| 5,457,447 | A |   | 10/1995 | Ghaem et al. |
| 5,672,946 | A | * | 9/1997 | Kawashima et al. ........ 318/444 |
| 5,710,539 | A | * | 1/1998 | Iida .............................. 340/444 |
| 5,749,984 | A |   | 5/1998 | Frey et al. |
| 5,869,189 | A |   | 2/1999 | Hagood, IV et al. |
| 6,048,622 | A |   | 4/2000 | Hagood, IV et al. |
| 6,438,193 | B1 | * | 8/2002 | Ko et al. .................... 377/24.1 |
| 6,763,288 | B1 | * | 7/2004 | Caretta et al. ................ 701/1 |
| 6,768,418 | B1 | * | 7/2004 | Tominaga et al. .......... 340/444 |

(Continued)

FOREIGN PATENT DOCUMENTS

WO           9915631         7/1999

OTHER PUBLICATIONS

PIC16LF876 microcontroller manufactured by Microchip Technologies of Chandler AZ.

*Primary Examiner*—Hung Nguyen
(74) *Attorney, Agent, or Firm*—Dority & Manning PA

(57) ABSTRACT

A self-powered tire revolution counter includes a motion sensitive power generation mechanism, a power conditioner, a pulse detector, a microcontroller, and, optionally, a radio frequency (RF) transmitting device. In one exemplary embodiment, the power generation mechanism corresponds to a piezoelectric patch that, during movement, provides both operating electrical power and pulsed signals indicative of tire rotation. The power conditioner receives a generator signal from the power generation mechanism and produces a conditioned output voltage that can be used to power associated electronic devices, including the microcontroller. The pulse detector receives the generator signal and produces a detection signal whenever the generator signal meets a predetermined condition. The microcontroller is programmed to determine current and lifetime-accumulated values of selected pulse indications in the detection signal that meet predetermined criteria. Data corresponding to tire environment related parameters such as temperature, pressure, tire deflection, and/or vehicle speed may be stored in the microcontroller at times during tire rotation as power is supplied from the power generation mechanism through the power conditioner. Additional data may be supplied to the microcontroller directly from an external source and read from the microcontroller either by direct electrical contact or via selective RF transmission.

28 Claims, 7 Drawing Sheets

U.S. PATENT DOCUMENTS 6,888,450 B1 * 5/2005 Sasaki et al. ............... 340/445
6,959,593 B1 * 11/2005 Mancosu et al. ............. 73/146
2003/0209063 A1 11/2003 Adamson et al.
2003/0209064 A1 11/2003 Adamson et al.

* cited by examiner

INTEGRATED SELF-POWERED TIRE REVOLUTION COUNTER

FIELD OF THE INVENTION

The present invention generally concerns a system and method for subjecting piezoelectric structures to the mechanical energy of conventional tire rotation, thereby generating electric power for integrated tire electronics and providing tire rotation signals. Piezoelectric technology is utilized to convert mechanical strain associated with tire flexure to a power supply output that can then power electronic components such as a microcontroller as well as radio frequency (RF) transmission devices. In addition to generating power for the associated electronics, the mechanical strain associated with the tire flexure produces a signal that is processed using a special algorithm to produce an accurate tire revolution count.

BACKGROUND OF THE INVENTION

The incorporation of electronic devices with pneumatic tire structures yields many practical advantages. Tire electronics may include sensors and other components for obtaining information regarding various physical parameters of a tire, such as temperature, pressure, number of tire revolutions, vehicle speed, etc. Such performance information may become useful in tire monitoring and warning systems, and may even potentially be employed with feedback systems to regulate proper tire pressure levels.

U.S. Pat. No. 5,749,984 (Frey et al.) discloses a tire monitoring system and method that is capable of determining such information as tire deflection, tire speed, and number of tire revolutions. Another example of a tire electronics system can be found in U.S. Pat. No. 4,510,484 (Snyder), which concerns an abnormal tire condition warning system.

U.S. Pat. No. 4,862,486 (Wing et al.) also relates to tire electronics, and more particularly discloses an exemplary revolution counter for use in conjunction with automotive and truck tires.

Yet another potential capability offered by electronics systems integrated with tire structures corresponds to asset tracking and performance characterization for commercial vehicular applications. Commercial truck fleets, aviation crafts and earthmover/mining vehicles are all viable industries that could utilize the benefits of tire electronic systems and related information transmission. Tire sensors can determine the distance each tire in a vehicle has traveled and thus aid in maintenance planning for such commercial systems. Vehicle location and performance can be optimized for more expensive applications such as those concerning earth-mining equipment. Entire fleets of vehicles could be tracked using RF tag transmission, exemplary aspects of which are disclosed in U.S. Pat. No. 5,457,447 (Ghaem et al.).

Such integrated tire electronics systems have conventionally been powered by a variety of techniques and different power generation systems. Examples of mechanical features for generating energy from tire movement are disclosed in U.S. Pat. Nos. 4,061,200 (Thompson) and 3,760,351 (Thomas). Such examples provide bulky complex systems that are generally not preferred for incorporation with modern tire applications. Yet another option for powering tire electronics systems is disclosed in U.S. Pat. No. 4,510,484 (Snyder), which concerns a piezoelectric reed power supply symmetrically configured about a radiating centerline of a tire.

Another typical solution for powering tire electronics systems corresponds to the use of a non-rechargeable battery, which inherently provides an inconvenience to the tire user since proper electronics system operation is dependent on periodic battery replacement. Conventional batteries also often contain heavy metals that are not environmentally friendly and which present disposal concerns, especially when employed in large quantities. Still further, batteries tend to deplete their energy storage quite rapidly when powering electronic applications characterized by complex levels of functionality. Battery storage depletion is especially prevalent in electronic systems that transmit information over a relatively far distance such as from truck wheel locations to a receiver in the truck cabin. Even when batteries are used in electronics systems that transmit from wheel locations to a closer receiver location, information is then typically relayed via hard-wire transmission medium from the RF receiver location to the vehicle cab thus requiring the installation of additional and often-expensive communications hardware in a vehicle.

Yet another known method for deriving power for tire monitoring systems relates to scavenging RF beam power with an interrogation antenna in close proximity to a tire and integrated electronic features. Energy that is radiated from the antenna is scavenged to power the electronics, which must often be very specialized ultra-low-power electronics limited to within a few microwatts. Interrogation antennas employed in conjunction with beam-powered electronics must typically be placed in relatively close proximity (within about two feet) to each wheel well due to limited transmission ranges. This typically requires multiple interrogation antennas per vehicle, thus adding to potential equipment costs. Each antenna is also quite susceptible to damage from road hazards, and thus for many reasons may not be the most desirable solution for powering certain tire electronic applications.

In accordance with the present subject matter, it is appreciated that certain advantages of piezoelectric materials have long been recognized. However, such technology is constantly improving, thus potentially affording applications that utilize piezoelectric materials with improved operating capabilities. Examples of relatively new advances in piezoelectric technology are provided in U.S. Pat. Nos. 5,869,189 (Hagood, I V et al.) and 6,048,622 (Hagood, I V et al.), directed to composites for structural control. The presently disclosed technology concerns further advances in piezoelectric technology such that a piezoelectric power generating device can be integrated with a tire or wheel assembly for purposes of energy harvesting as well as tire rotation signal generation.

Currently pending and co-owned U.S. patent application Ser. Nos. 10/143,535 and 10/345,040 disclose aspects of generating and harvesting electric power from a rotating tire's mechanical energy using piezoelectric materials. The present invention concerns further applications offered by the integration of such piezoelectric structures in a tire or wheel assembly. More particularly, such piezoelectric structures can be combined with additional features to provide a self-powered tire revolution counter in accordance with aspects of the present invention.

Known existing means for counting tire revolutions involve attaching a mechanical counter to a wheel hub. Since a mechanical counter is not integral to the tire, maintaining an accurate lifetime revolution count requires accurate record keeping. Considering that some tires are often moved to different wheel positions or even different vehicles, and/or can be recapped several times, record keeping is an inconvenient, error-prone, and unreliable process.

The disclosures of all of the foregoing United States patents and patent applications are hereby fully incorporated into this application for all purposes by reference thereto. While various tire electronics systems and power generation systems therefor have been developed, no design has emerged that generally encompasses all of the desired characteristics as hereafter presented in accordance with the subject technology.

SUMMARY OF THE INVENTION

In view of the recognized features encountered in the prior art and addressed by the present subject matter, an improved system and method for counting tire revolutions has been developed. Piezoelectric technology is utilized to convert mechanical strains associated with tire flexure to electric charge that is then utilized to operate associated electronics, such as a microcontroller and/or RF transmitter. The piezoelectric output signal is also analyzed in accordance with the disclosed technology to determine a revolution count for the associated tire.

Various features and aspects of the subject tire electronics system and power generating device offer a plurality of advantages. The disclosed technology provides for a self-powered tire revolution counter that is an integral component of a given tire. As such, the ability to maintain a substantially accurate lifetime revolution count for a tire is facilitated since the same revolution counter can be utilized regardless of whether the tire is moved to a different wheel position or different vehicle, or if the tire has been recapped after an initial period of usage.

Yet another advantage of certain embodiments of the present subject matter is that an integrated tire revolution counter is provided with self-powering features. A piezoelectric power generation component can provide a self-powered electronics system that is not dependent on replacement of batteries. Although batteries and battery-operated devices may still be incorporated with aspects of the present subject matter, many complications regarding tire electronics that are solely powered by batteries are obviated in accordance with the disclosed technology. The disclosed piezoelectric technology provides additional advantages over still further known methods for providing power including the possibility of employing the disclosed piezoelectric devices to supply charge to associated batteries.

One particular aspect of certain embodiments of the present technology relates to methodology for analyzing signals generated by the piezoelectric structure to accurately count tire rotations. A generated signal includes pulses that are detected when the piezoelectric output signal exceeds a threshold level. Those signal pulses may then be analyzed via an exemplary speed adaptive cadence algorithm that facilitates determination of which pulses represent a valid tire rotation. Determining that a valid tire rotation has occurred results in incrementing a current revolution count, which may be selectively added to a lifetime revolution count for a given tire.

In one exemplary embodiment of the present technology, a self-powered tire revolution counter includes a power generation mechanism, a power conditioner, a pulse detector, and a microcontroller. In one exemplary embodiment, the power generation mechanism corresponds to a piezoelectric patch, such as a piezoelectric composite structure, that provides both operating electrical power and a pulsed signal indicative of tire rotation. The power conditioner receives a generator signal from the power generation mechanism and produces a regulated output voltage that can be used to power associated electronic devices, including the microcontroller as well as to charge any system associated batteries. The pulse detector receives the generator signal and produces a detection signal having respective pulse indications whenever the detection signal exceeds a threshold level. The microcontroller is programmed to determine current and lifetime accumulated values of selected pulse indications in the detection signal that meet a predetermined criteria for corresponding to a valid tire revolution.

Additional information analyzed by and stored in the microcontroller may relate to such data as associated tire temperature, pressure, amount of deflection, identification variables, tire revolutions, vehicle speed, highest rotational speed, and/or distance traveled. Additional information may be calculated and stored relating to the just named parameters with relation to the units measured over measure miles traveled. For example, one may be interested in the temperature variation in a tire as such may relate to miles traveled. Thus one may wish to record miles at temperature, miles at speed, revolutions at temperature, load or pressure at speed or temperature, or other and varied combinations of potentially relevant data. Alternatively, one may be interested in the number of tire revolutions accumulated over measured distances. Variations in such data from tire to tire on a single vehicle may be able to show that certain of the tires had experienced significantly different numbers of revolutions than others. Such data might be used in warranty administration to show abuse of the tires, as, for example, by being able to establish that the rear tires of a vehicle had undergone significantly more revolutions that the front tires of the same vehicle which might be an indication of intentional rapid acceleration attempts. Alternatively, differences in revolution count totals between certain tires may give an indication of the occurrence of one or more deceleration events of interest such as may occur with a sudden change from a high revolution rate to a low or zero rate as may happen during skidding or wheel lock. Of course, rapid changes in acceleration and/or deceleration may be detected and recorded by monitoring the rate of change of rotational speed of any one tire independently of other tires.

Some of this data may be determined from the generator signal or additional condition-responsive devices may be provided for sensing the desired parameters. Information in the microcontroller may then be relayed to a data reader either by direct contact method or via selective RF transmission. In one exemplary arrangement, data from the microcontroller or an outside source may be sent to an RFID device by way of direct contact, i.e., via direct electrical connection, and subsequently read out from the RFID device via RF transmission. One advantage of such a data contact-write, non-contact-read configuration is that data can be written as power is provided by the piezoelectric generator during tire rotation and data can be read out at tire stand still via RFID interrogator devices that may supply power to the RFID devices via a radiated RF field.

In accordance with another exemplary embodiment of the present subject matter, a pneumatic tire includes a tire structure and a self-powered revolution counter as briefly described above. The tire structure is characterized by a crown having an exterior tread portion, bead portions, exterior sidewall portions extending between each bead portion and the crown, and an inner liner along interior crown and sidewall surfaces. The revolution counter may be mounted to the inner liner of the tire or cured within the tire structure.

Still further exemplary embodiments of the disclosed technology concern methodology for counting completed revolutions of a tire. In accordance with such exemplary methodology, a generator is provided for producing a pulse signal upon detection of a repeating predetermined condition (e.g., a tire revolution). The elapsed time between first and second detected pulses in the generator signal is measured to produce a current time value. This value may then be stored in a circular buffer and compared with other values stored in the buffer. One example of the actual parameter to which the current time value is compared is a fractional value of the maximum value of selected previously stored time values in the buffer. If the current time value exceeds the comparison parameter, then the detected pulse is counted as a complete tire revolution and a counter is incremented. This process is continually repeated during active rotation of a tire.

Additional aspects and advantages of the present subject matter are set forth in, or will be apparent to, those of ordinary skill in the art from the detailed description herein. Also, it should be further appreciated that modifications and variations to the specifically illustrated, referred and discussed features and steps hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in this summarized section, may include and incorporate various combinations of aspects of features, components, or steps referenced in the summarized objectives above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1:
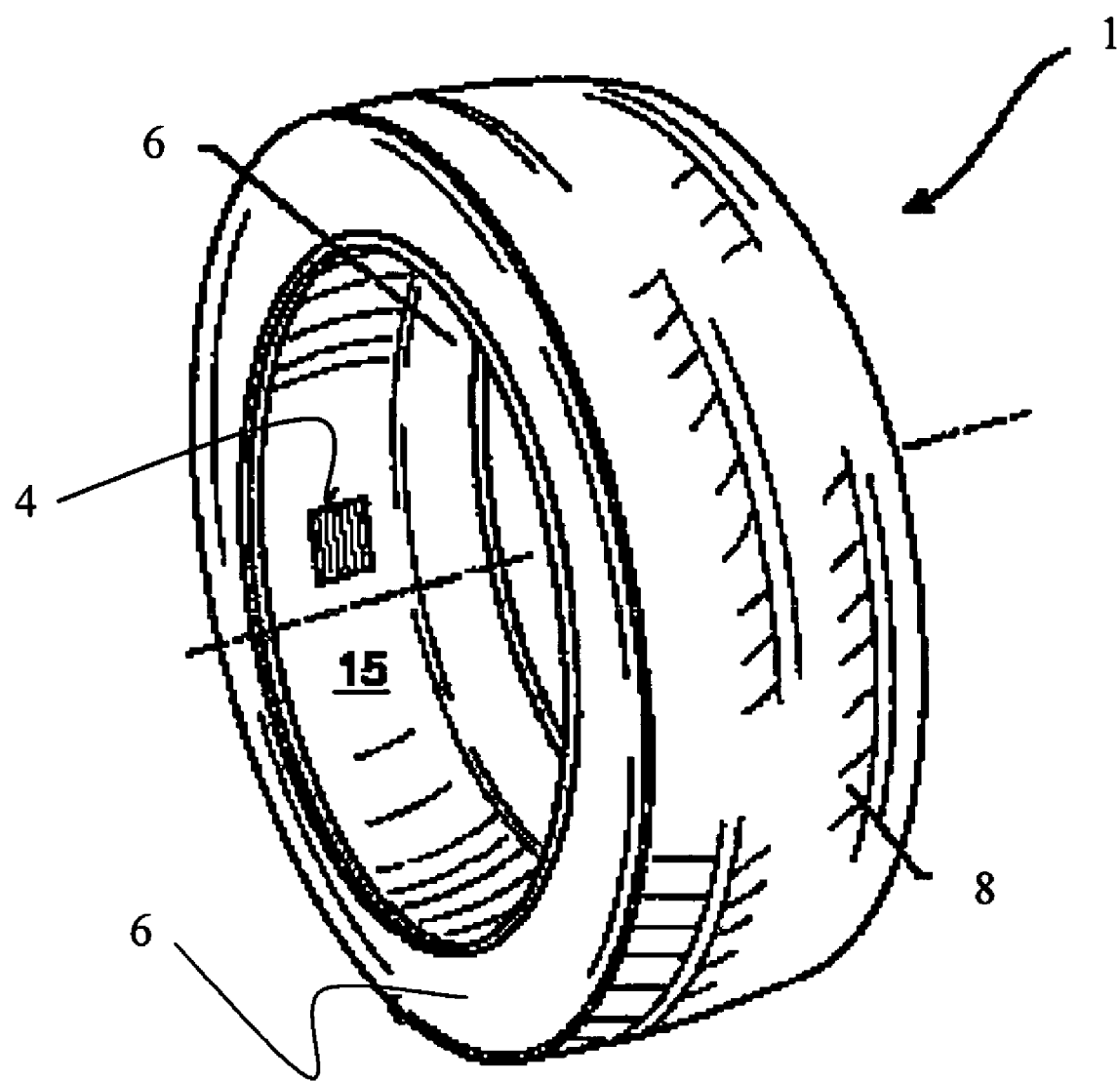
FIG. 1 displays a self-powered tire revolution counter mounted to the inner liner of a tire in accordance with the present invention.

Repeat use of reference characters throughout the present specification and appended drawings is intended to represent the same or analogous features or elements of the invention.

DETAILED DESCRIPTION OF THE PREFERRED EMBODIMENTS

As discussed in the Summary of the Invention section, the present technology is particularly concerned with an improved system and method for counting tire revolutions and providing power to electronic systems integrated within a tire structure. In addition to generating power for the associated electronics, the mechanical strain associated with tire flexure produces a signal that is processed using a specialized algorithm to produce an accurate tire revolution count.

An integrated self-powered tire revolution counter in accordance with certain embodiments of the presently disclosed technology generally includes four principle components: a piezoelectric structure, a pulse detector, a power conditioner and a microcontroller. Aspects of each of these principle components, as well as other related components including the revolution counter's placement in and communication from within a tire or wheel assembly, will be discussed herein. Selected combinations of the aforementioned aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function. Similarly, certain process steps may be interchanged or employed in combination with other steps to yield additional exemplary embodiments of a method for generating electric power from a rotating tire's mechanical energy.

Reference will now be made in detail to exemplary embodiments of the subject system and method of counting tire revolutions using an integrated self-powered device provided within a tire or wheel assembly. Referring now to the drawings, FIG. 1 depicts an exemplary perspective view of a pneumatic tire 1 characterized by a crown having an exterior tread portion 8, bead portions, and sidewall portions 6 extending between each tire bead and the crown. An inner liner 2 is provided along the interior crown and sidewall surfaces, to which a self-powered tire revolution counter and/or other tire electronics in accordance with the present subject matter may be mounted.

Figure 2:
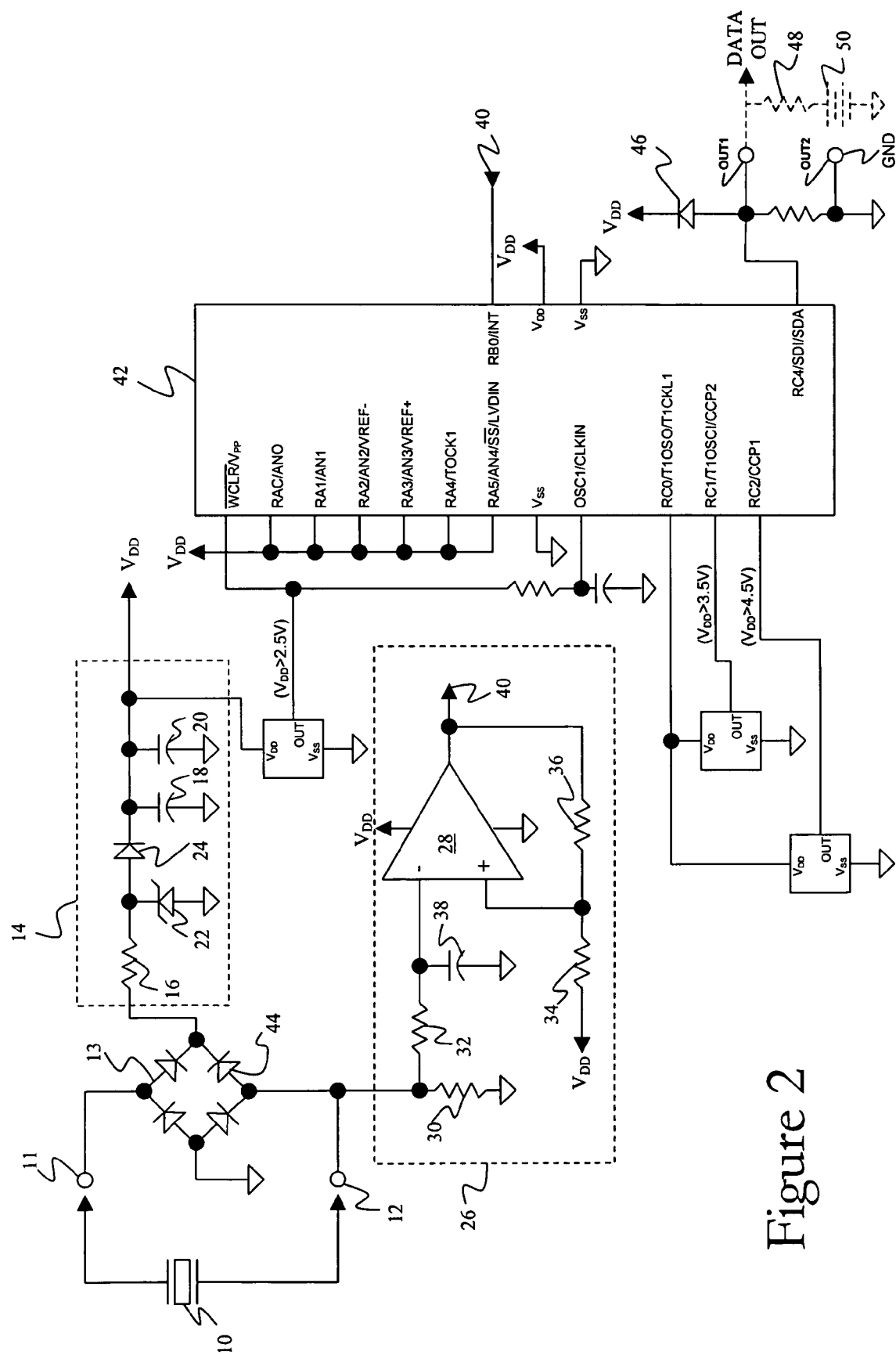
FIG. 2 displays a schematic diagram of a self-powered tire revolution counter in accordance with a first embodiment of the present invention.

FIG. 2 displays a schematic diagram of a self-powered tire revolution counter in accordance with a first embodiment of the present invention. As may be observed from an inspection of FIG. 2, the electronic circuitry associated with the present technology may be considered as various components or subsystems, each of which will be discussed herein.

A first component of the self-powered tire revolution counter in accordance with the present technology is a piezoelectric structure shown in FIG. 2 as piezoelectric patch 10. An exemplary type of piezoelectric material that may be utilized in accordance with the present subject matter is a piezoelectric fiber composite structure such as disclosed in the previously mentioned Hagood, I V et al. '189 and '622 patents. As will be apparent to those of ordinary skill in the art, other types of piezoelectric material may also be employed as piezoelectric patch 10, non-limiting examples of which may be solid structure and composite structure devices. In this light, the basic requirements for piezoelectric patch 10 are that it is capable of performing two functions within the overall system. First, the piezoelectric patch 10 provides a source of power for the remainder of the circuitry and, second, the piezoelectric patch 10 provides signal pulses associated with tire revolutions that are then processed by other components of the tire revolution counter circuit. As the piezoelectric patch 10 is subjected to strain and vibrations upon rotation of the tire or wheel in which it is mounted, operating power may be harvested to supply the remainder of the electrical or electronic components associated with the tire revolution counter circuit. While the piezoelectric patch's power generation capability enables the self-powering feature of the tire revolution counter of the present technology, it should, of course, be kept in mind that this "self-powering" feature, while of significance to the current technology, does not preclude the use of a conventional battery as the sole source of power or as an addition to or backup for the piezoelectric patch as a power source for the remainder of the associated circuitry.

The capabilities of the piezoelectric patch as a power generation device offer numerous advantages over conventional techniques for providing power within a tire assembly; however, other power sources may be used. For example, as will be later discussed, external power sources may be utilized in conjunction with exemplary embodiments of the invention using both contact and non-contact reading of stored operational data. Such external power sources may include both external batteries and other power supplies for embodiments of the present invention using contact reading of stored data and antenna beam power scavenging techniques for embodiments of the present invention using non-contact reading of store data. Thus, although the presently disclosed technology provides for a power generation device that enables antenna beam power and batteries to be eliminated, it should be appreciated that a power generation device could employ a hybrid combination of piezoelectric technology and/or batteries and/or antenna beam scavenging to power different selected electronic components within a wheel assembly. Many different possibilities for power generation/provision clearly are possible including the above mentioned combinations as well as others where, for example, the piezoelectric device could be configured to charge a battery that could be arranged to operate as a backup power source or as a power source when the tire is at stand still and power generation for the piezoelectric source is generally unavailable.

Figure 3:
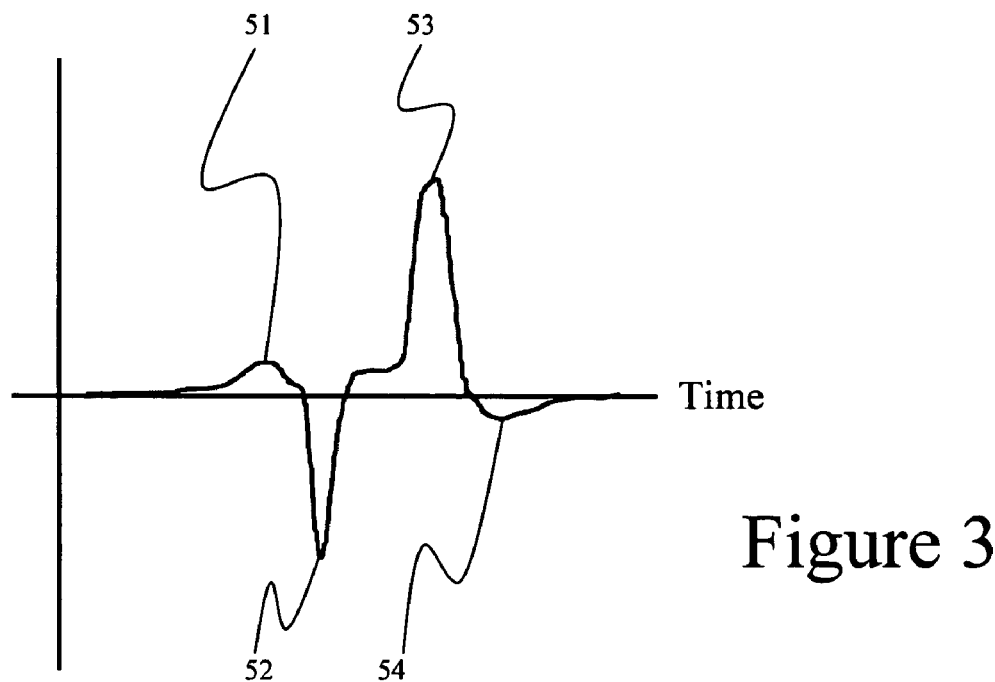
FIG. 3 displays an expanded view waveform illustrating the output voltage of a piezoelectric patch in accordance with the present invention.

With further reference to the power generating function of the piezoelectric patch, it will be seen from FIG. 2 that piezoelectric patch 10 is connected to the input of a full wave bridge rectifier 13. It should be appreciated that alternative rectifier configurations such as a doubling rectifier or an n-stage voltage multiplier could also be utilized. Moreover, other types of power supplies and conditioning circuits might be employed including such as switching power supplies. As the piezoelectric patch 10 is flexed during tire rotation, a voltage generated thereby, as illustrated in FIG. 3, is impressed across terminals 11, 12 and is passed to full wave rectifier 13. A portion of the output voltage of the bridge rectifier 13 is directed to a power conditioning circuit 14 consisting of resistor 16, capacitors 18, 20 and diodes 22, 24. These elements are configured to provide an output voltage $V_{DD}$ that is applied to various elements of the associated circuitry as a power supply signal. Zener diode 22 and resistor 16 are connected in series across the output of the bridge rectifier 13 and are designed to regulate and limit the output voltage $V_{DD}$ of the power supply while capacitors 18, 20 act as power supply filters and temporary energy storage devices. Isolation diode 24 prevents leakage of the energy stored in capacitors 18, 20 back into the zener regulator 22. In an exemplary embodiment, zener diode 22 limits the output voltage $V_{DD}$ to approximately 5.5 volts.

Referring still to FIG. 2, another portion of the output voltage from full wave bridge rectifier 13 is directed to a pulse detector circuit 26 which constitutes a third major component of the tire revolution counter circuit of the present invention. As may be seen from FIG. 2, the pulse detector circuit 26 consists of a comparator 28, resistors 30, 32, 34, and 36 and capacitor 38. Generally, the components of pulse detector circuit 26 function to compare the output of piezoelectric patch 10 with a threshold signal and to generate an indicative output each time a pulse on the power signal from piezoelectric patch 10 is detected. Pulses registered by pulse detector circuit 26 are correlated to the number of revolutions a tire undergoes. One example of a comparator usable with the present technology is an LMC7215 micro-power comparator manufactured by National Semiconductor. Resistor 32 and capacitor 38 are connected in series and at their common junction to the negative input terminal of the comparator 28 and together with resistor 30 form an input low pass filter for the tire revolution pulse signals originating from the piezoelectric patch 10. The low pass filter configuration assists in removing spurious noise from the tire revolution pulse input signal from the piezoelectric patch. In one exemplary embodiment, the low pass filter has an upper cutoff frequency of 32 Hz. The positive terminal of the comparator 28 is connected in a voltage divider arrangement consisting of resistors 34 and 36 and provides a variable reference value to the positive terminal of comparator 28. One terminal of resistor 34 functions as the input to the voltage divider arrangement of resistors 34, 36 and is connected to power supply signal $V_{DD}$. The provision of signal $V_{DD}$ in pulse detector circuit 26 provides an adaptive threshold for the comparator 28 since $V_{DD}$ increases as the pulse magnitude from the piezoelectric patch increases up to the limit established by zener diode 22. The output 40 of the comparator 28 is applied to an input of microcontroller 42 and processed thereby in a manner to be described later. Alternative configurations for the pulse detector may be employed, of course, and such may involve concepts including current reversal, current threshold detection, power supply voltage change with time (dv/dt), zero crossing detection with or without hysteresis, or waveform signature analysis. One of these concepts, current threshold detection, will be discussed more fully later with respect to FIG. 2(a).

One unique aspect of this embodiment of the present technology is the shared use of several components within the power conditioning circuit 14 and the pulse detector circuit 26. In this regard, resistor 30 serves the dual function of a load resistor and as a portion of the tire revolution pulse input filter with resistor 32 and capacitor 38. In like manner, diode 44 of the full wave bridge rectifier 13 connected between resistors 30 and 16 works together with isolation diode 24 of the power conditioning circuit 14 to enhance low speed pulse detection by allowing weak pulses to raise the voltage across input terminals 11 and 12 by two diode drops above $V_{DD}$ even without impressing an appreciable voltage across 16.

Turning now to the fourth principle component of the exemplary self-powered tire revolution counter illustrated in FIG. 2, attention is directed to the microcontroller 42. Microcontroller 42 may be a low power integrated circuit and includes several component sections including a processor, a non-volatile flash programmable memory (EE-Prom), a random access memory (RAM), an analog to digital converter and serial communications capabilities. In an exemplary embodiment, microcontroller 42 is a PIC16LF876 manufactured by Microchip Technologies of Chandler, Ariz., however any other suitable microcontroller may be used with the present technology. The microcontroller 42, during tire rotation operation, is powered, along with the other components of the tire revolution counter circuit, via power signal $V_{DD}$. In order to conserve as much energy as possible, the microcontroller 42 is configured such that the microcontroller 42 is placed in a "sleep" mode for a significant portion of the normal operating cycle. For example, at low rotational speeds, the microcontroller 42 spends about 97% of the time in a sleep mode. The microcontroller 42 is configured to "wake up" about every 20 milliseconds in order that it might check whether a pulse has been detected, check the power supply signal $V_{DD}$ and then immediately go back to sleep. During the wakeup period, if the microcontroller 42 determines that pulse detection circuit 26 has detected a pulse, an analysis of the pulse is undertaken as will be more fully described later. On the other hand, if during the wakeup period, microcontroller 42 determines that the power supply signal $V_{DD}$ is becoming critically low, possibly due to the rotational speed of the tire dropping below a predefined level, microcontroller 42 undertakes a process to save accumulated data to the onboard non-volatile memory (not shown) for later read out.

As illustrated in FIG. 2, in an exemplary embodiment of the present technology, the onboard non-volatile memory may be read out by connecting the data out terminal RC4/SDI/SDA of the microcontroller 42 to a resistor 48 in series with an external 5-volt power supply. Microcontroller 42 senses a logical high on its output pin, converts the pin to an output and transmits the data out serially to a reader coupled thereto. Diode 46 taps power from the serial data connection to power the microcontroller 42 during the data download process, thus providing data and power via a single output line.

Figure 2A:
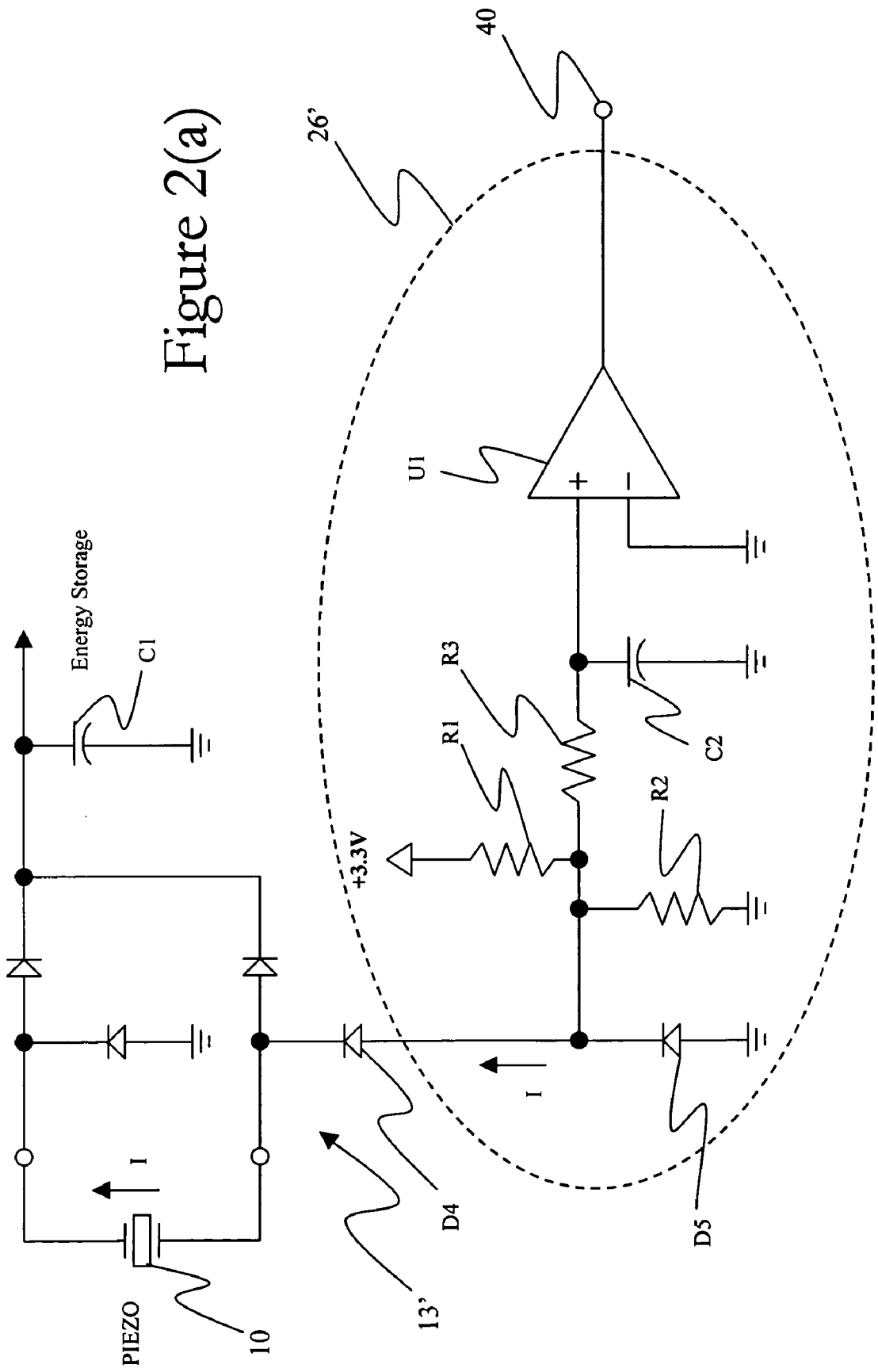
FIG. 2(a) displays a schematic diagram of an pulse detector employing a current threshold methodology that may be used as an alternative to the pulse detector portion of the self-powered tire revolution counter illustrated in FIG. 2.

Referring now to FIG. 2(a), an alternative configuration of the full wave rectifier and pulse detector is illustrated. As seen in FIG. 2(a), full wave rectifier 13' is configured such that one leg thereof includes dual diodes D4 and D5 in an arrangement wherein a current pulse I generated by piezoelectric patch 10 upon tire rotation may be detected by current threshold detector 26'. Resistors R1 and R2 for a voltage divider that sets the quiescent level of comparator U1's positive input to a predetermined value. When the piezoelectric patch 10 is strained such that a resulting current I flows in the indicated direction, the R1–R2 junction will be pulled down toward ground potential. When that junction drops below ground, the output terminal 40 of comparator U1 will change from high to low. This signal at output terminal 40 may then be applied to the microcontroller as previously shown with respect to FIG. 2. Diode D5 will act as a clamp to limit the R1–R2 junction to one diode drop (about –0.7 volts) below ground while resistor R3 and capacitor C2 form a low-pass filter to attenuate high frequency noise on the signal.

It should be borne in mind that even this alternative arrangement of the pulse detector does not combine with the previously discussed FIG. 2 configuration to provide all-inclusive forms of pulse detectors usable in the present technology. To the contrary other methods might involve analyzing the time structure of the waveform generated by the piezoelectric patch 10 using analog or digital circuitry, or computationally, or any combination of these methods. Such methods could range from the relatively simple, such as derivative (rate-of-change) analysis methods or integral analysis methods, to relatively complex, such as computationally more involved signature analysis methods.

Yet another pulse detection method might involve simply monitoring the voltage of the main energy storage capacitor and attributing any significant increase in that voltage to a revolution of the tire. Here, revolutions of the tire are assumed, of course, to be the cause of any significant energy-producing strain events experienced by the piezoelectric patch 10. It should be noted, however, that since a single revolution of the tire can produce more than one energy pulse, some sort of intelligent analysis of the time sampled voltage readings would still be indicated, such as the adaptive cadence analysis algorithm as will be described later with respect to FIG. 5.

Figure 6:
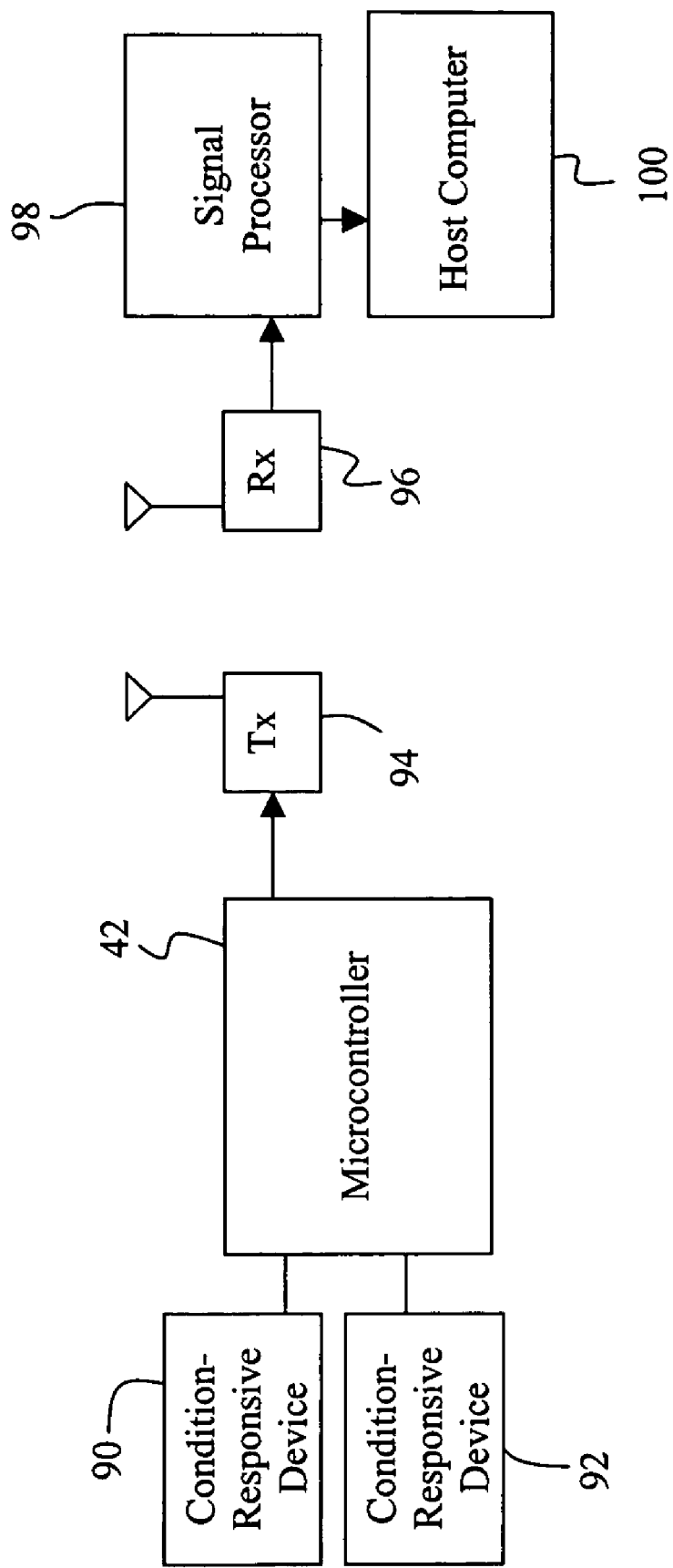
FIG. 6 displays an exemplary arrangement for wirelessly communicating data from integrated tire electronics in accordance with the present technology.

Referring now to FIG. 6, another option for transmitting data stored in microcontroller 42 is to send the stored information by way of a radio frequency (RF) transmitter 94 to a remote receiver location 96. An example of respective transmitter and receiver modules for utilization with aspects of the disclosed technology corresponds to respective TX2 and RX2 brand UHF FM Data Transmitter and Receiver Modules such as offered for sale by Radiometrix Ltd. The energy to operate RF transmitter 94 may be supplied by the piezoelectric generator and stored as required in a capacitor, rechargeable battery, or any other electrical energy storage device until sufficient energy is available to transmit the data. Any of several schemes can be used to determine when to transmit the data. In one method, the data could be transmitted periodically at either a fixed or random time between transmissions. In yet another method, the data could be transmitted when one or more of the measured parameters meets or exceeds some value. In yet other methods, data could be transmitted in response to a query, initiated outside the tire by RF transmission, by a magnetic coupling, or by mechanical initiation.

Mechanical initiation of data transmission could include such as manually tapping on the tire in a specific sequence that could be sensed by the piezoelectric patch and recognized and decoded by the microprocessor as a command code to initiate data transmission. Alternative mechanical initiation schemes could include providing a specifically configured, permanently placed or temporarily installed "rumble strip" as sometimes installed on the side of a road to alert a driver that his/her vehicle is too close to the edge of the road that would be "encoded" with a specifically coded sequence of bumps corresponding to a "data send" (or any other desired type) command sequence. Such an arrangement might have specific advantages when used in association with a vehicle holding area so that, upon movement into or out of such an area, passage of the vehicle over coded rumble strips would automatically initiate data transmission from the vehicle tires or some other tire data related event.

Figure 6A:
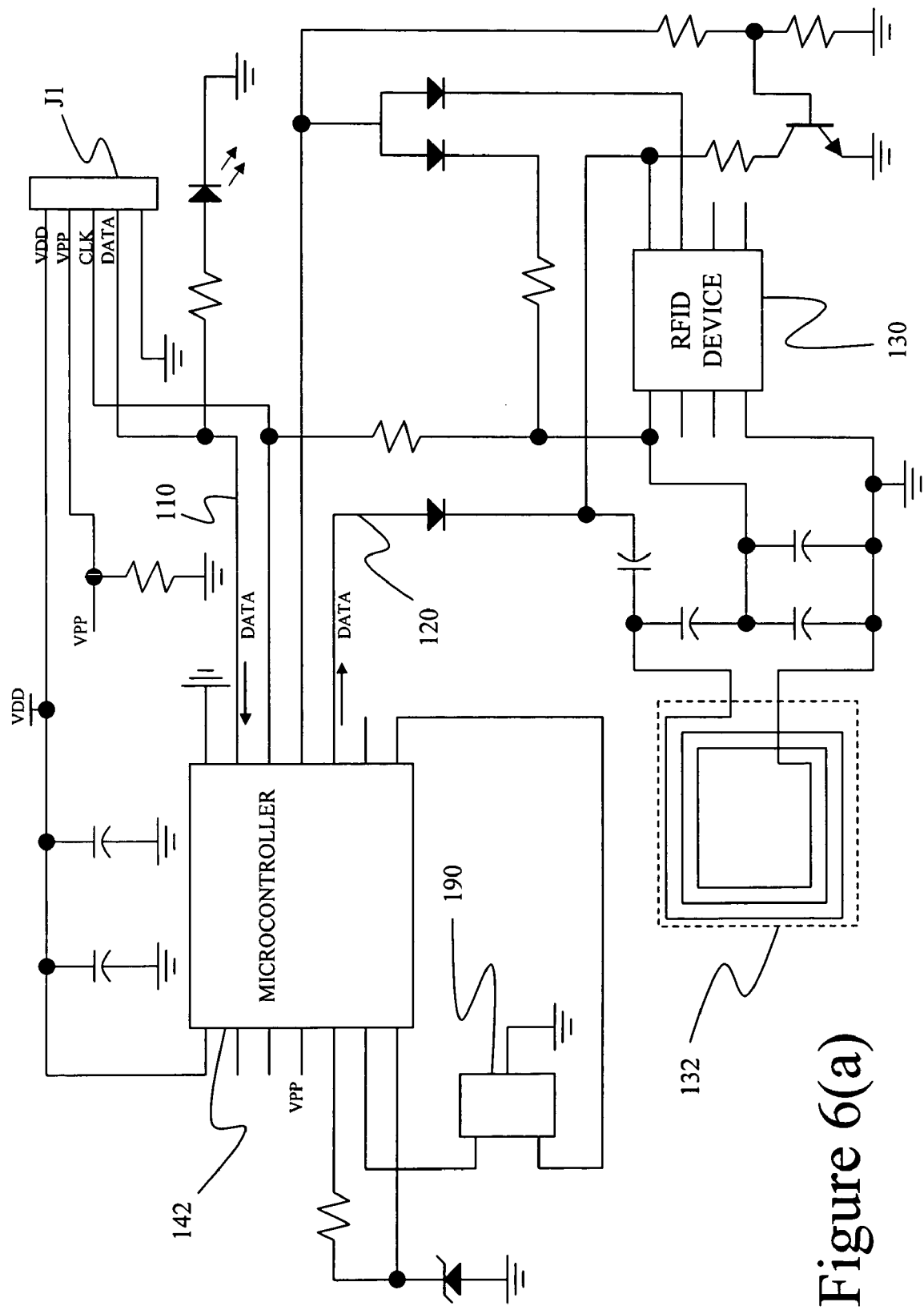
FIG. 6(a) displays an exemplary arrangement for writing data directly to an integrated tire electronics device while reading the data via wireless techniques.

Referring now to FIG. 6(a), another exemplary arrangement for transferring data between an RFID device and external devices or systems is illustrated. In particular, the configuration illustrated in FIG. 6(a) is one that may be designated as a contact-write/non-contact read arrangement. More particularly, RFID device 130 may be associated with a microcontroller 142 in a configuration with other peripheral components that permits writing of data to the RFID device and microcontroller by way of an external device, possibly an external computer or other type of control device, via external connector J1 or by way of self collected data obtain during operation of the monitored tires via associated sensors. For example, data to be written to the RFID device 130 and microcontroller 142 may also be obtained from various sensors associated with the microcontroller 142 including the exemplarily illustrated temperature sensor 190. Other types of sensors, either separately or in combination with temperature sensor 130, may also be employed, of course. Such sensors might include pressure sensors, motion or movement sensors, voltage, current or power sensors, or any other type of tire parameter or electrical related sensor as may be appropriate for any given installation. Data written to the microcontroller 142 and RFID device 130 via connector J1 from external devices may be provided to control certain operations or parameters associated with the operation of the microcontroller 142 or the RFID device 130. For example, externally supplied data might be used to establish programmable threshold for data read from RFID device 130 or could be a source of manufacturing data (associated serial number, date and or place of manufacture, etc.) to be associated with the particular device configuration.

A significant aspect of the contact-write/non-contact read configuration of this embodiment of the present technology resides in that fact that while typically contact-programmable devices are used in a data invariant (i.e., read only) mode, the present technology allows using a contact-programmable device in a variable data mode. In operation, microcontroller 142 may write data to a non-volatile memory within RFID device 130 when power is available as, for example, during tire rotation when an associated piezoelectric generator/sensor may be supplying power to the device. Then anytime later, even if no power was available to operate microcontroller 142, the written data could be read in a standard fashion using a standard RFID interrogator in association with the RFID antenna 132 as the interrogator's RF field would supply power to the RFID device 132 and the microcontroller 142 could remain powered down. This type of contact-write/non-contact read operation might have particular advantages in applications involving tire electronics in that such use could obviate the need to dismount the tire to access an electronic device and read data from it.

Referring once again to FIG. 6, a vehicle employing tire assemblies with self-powered revolution counters according to the present subject matter may be equipped with a single receiver for obtaining the wirelessly transmitted information from each tire structure. In such instance, information is transmitted from each wheel assembly to RF receiver 96, where the received information is demodulated from its carrier signal and provided to a signal processor 98. A carrier detection signal may also be provided from RF receiver 96 to signal processor 98. The data output from RF receiver 96 and the carrier detection signal are preferably multiplied together in signal processor 98 such that a signal without spurious noise is obtained. This data signal with reduced error probability is then preferably routed to a driver circuit that converts the digital signal to a signal with voltage levels suitable for transmission via an RS232 interface to a host computer 100. Terminal emulation software is preferably provided at host computer 100 such that the received data is converted to information readily usable by an end user, such as that provided on a readable display module.

Figure 4:
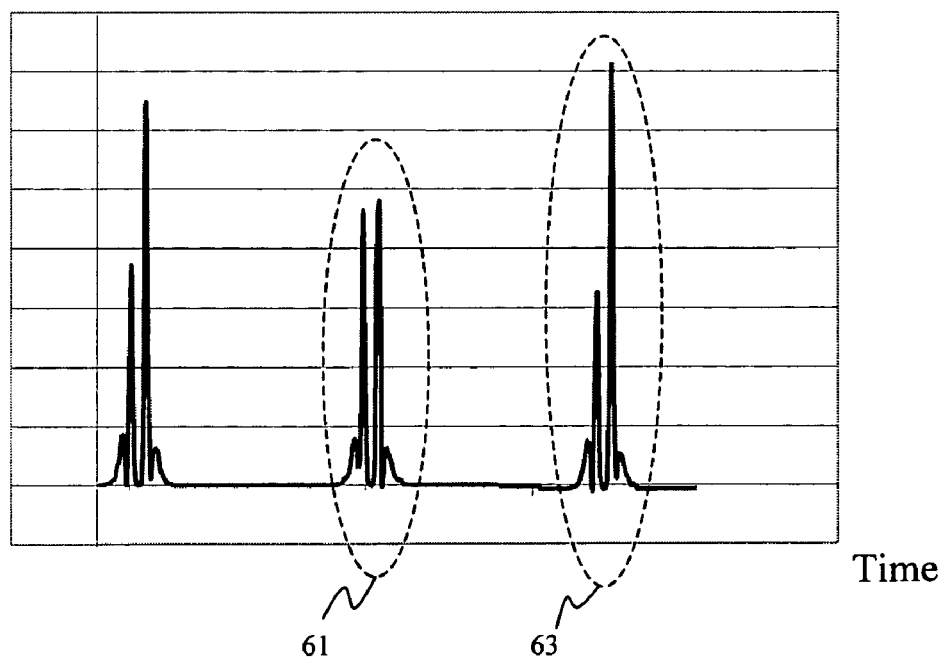
FIG. 4 displays an exemplary waveform illustrating the rectified output of a piezoelectric patch over multiple tire revolutions.

As previously noted, if during the wakeup period microcontroller 42 determines that a pulse has been received at terminal 40, an analysis of the parameters associated with the detected pulse as well as other operational conditions associated with the tire is undertaken. A principle goal of this analysis is to determine whether the detected pulse is a valid tire rotation pulse and, if so, to increment a counter to keep an accurate count of the total tire revolutions. The technique used to analyze the pulses can best be described as a speed-adaptive cadence analysis algorithm for counting tire revolutions, such as now discussed with reference to FIGS. 3–5, respectively. In operation, the piezoelectric patch 10 produces a waveform as illustrated in FIG. 3 that can vary with changes in mechanical and electrical operating conditions, particularly electrical load current. Typically, the open circuit waveform comprises two positive pulses 51, 53 and two negative pulses 52, 54. The boundary pulses 51, 54 are typically lower magnitude and longer duration; the middle pulses 52, 53 are typically higher magnitude and shorter duration. But when the electrical signal is rectified, as illustrated in FIG. 4, and current is drawn from it to operate an electronic device, the signal characteristics can change drastically. The result is that a half-wave rectified version of the signal will sometimes exhibit two pulses per revolution, i.e. a couplet 61 (FIG. 4), and sometimes only one pulse per revolution or pulses with significantly different amplitudes as in couplet 63 (FIG. 4). Additionally, disturbances from the road surface like bumps, cracks, debris, etc., can produce extraneous pulses when they occur near the piezoelectric patch. Therefore, it is impossible to accurately determine the actual number of revolutions by simply counting the pulses. A more intelligent analysis of the signal is required.

The present technology analyzes the signal from piezoelectric patch 10 and determines the actual number of revolutions using a speed-adaptive cadence analysis. Exemplary steps in such an algorithm are illustrated in the block diagram of FIG. 5, which will now be discussed in further detail. When a tire starts rolling, the integrated tire electronics will power up after a few initial revolutions above a minimum operating speed and the current revolution count is initialized to a near-zero value. Once the tire electronics are enabled, a circular buffer records in step 70 the tire's period of rotation, or time elapsed between successive pulses, for the last n+1 pulses, thus yielding n time period measurements. The number of period measurements n examined can be varied, but in an exemplary embodiment n may be set to 6. The time can be measured by counting the number of microcontroller wakeups from pulse to pulse. Microcontroller 42 stays in a sleep mode most of the time to minimize power consumption but wakes up in response to a watchdog timer timeout every 20 milliseconds, or so, and thus the timing resolution would correspond to the 20 millisecond time period, however, any number of ways to measure elapsed time could be used such that no limitation should be ascribed to the invention as to a specific elapsed time measuring requirement.

Figure 5:
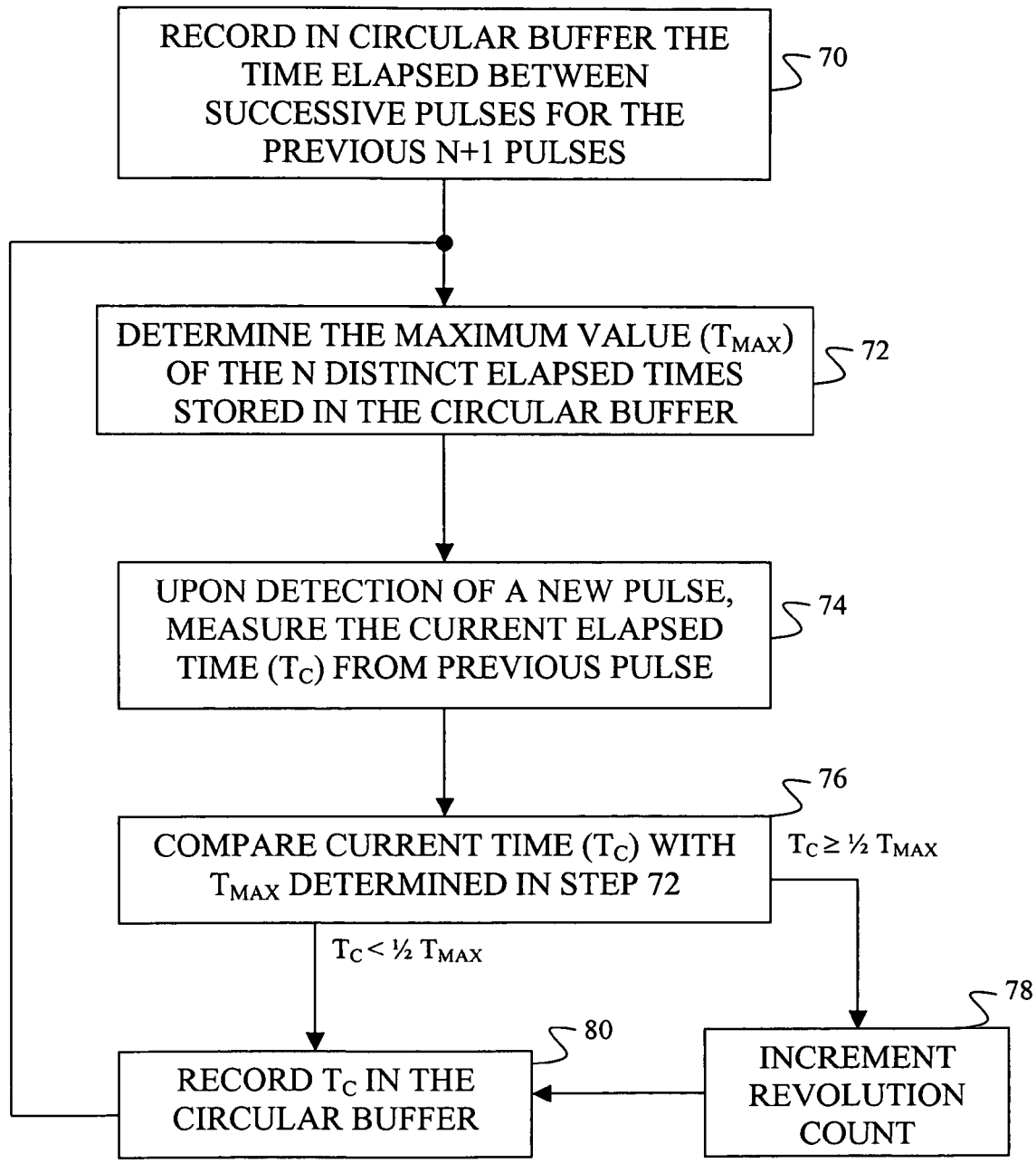
FIG. 5 displays a block diagram illustrating an exemplary algorithm for counting tire rotations in accordance with the present technology.

Referring still to FIG. 5, the n values stored in the circular buffer are analyzed in step 72 to determine the maximum value of the period measurements. The maximum determined value is established as variable $T_{MAX}$. When the next pulse is detected on signal 40, the current elapsed time is measured in step 74 from the previous detected pulse and this currently measured time value is established as variable $T_C$. Proceeding to step 76, $T_C$ is compared to the maximum value $T_{MAX}$ in the circular buffer as determined in step 72. If the current time ($T_C$) is greater than or equal to one half $T_{MAX}$, the pulse is considered to be valid, and the revolution counter is incremented in step 78. If the current time ($T_C$) is less than one half $T_{MAX}$, the pulse is rejected. Either way, the current time ($T_C$) is recorded in step 80 into the circular buffer. If the current time ($T_C$) is greater than the maximum time $T_{MAX}$ currently stored in the circular buffer, the variable $T_{MAX}$ is determined in the next iteration of step 72 to be the current time ($T_C$).

It should be appreciated that although the time threshold for comparison in the above exemplary algorithm is one half $T_{MAX}$, other specific fractional values of $T_{MAX}$ may also be utilized in accordance with the presently disclosed methodology.

The above process of detecting, analyzing and counting revolutions repeats as a tire continues to roll, and the current revolution count is incremented with each valid revolution of the tire. When the tire slows to below a minimum speed, and the available power level generated from the piezoelectric element drops below a required threshold for operation, the current revolution count is added to a lifetime count for the tire, and the updated lifetime count is stored in nonvolatile memory, such as that available in the associated microcontroller.

If, for each revolution, a single pulse is detected, the time value will (at steady speed) be equal to $T_{MAX}$, and each pulse will count as one revolution. If, for any revolution, a couplet 61, as illustrated in FIG. 4, is detected, the first pulse will count but the second pulse will be rejected because it will have occurred too quickly (less than half $T_{MAX}$) after the last pulse. If no revolutions, some revolutions, or all revolutions produce a couplet, the effect is the same; every revolution is correctly counted. The cadence analysis algorithm is designed to reject road noise as well as couplets. Any single spurious pulse that occurs earlier than one half $T_{MAX}$ after the last pulse should be rejected. Any spurious pulse that occurs later than one half $T_{MAX}$ should be counted, but will disqualify the next pulse. So no matter when the noise pulse occurs, the correct revolution count should be maintained. Even multiple noise pulses, i.e., a noise couplet or triplet, will be rejected unless they occur often enough to corrupt the buffer.

The cadence analysis algorithm also automatically adapts to variations or drift in the frequency of the clock used to measure the time interval between pulses. This accommodation for frequency drift allows the use of a low cost clock, such as an R-C clock typically used in cost sensitive microcontroller applications, to be used instead of a ceramic resonator, quartz crystal, or other higher-cost, high-accuracy clock generation methods, although any of these could be used if desired. Additionally, the cadence analysis algorithm automatically adapts to changes in the speed of the tire. The maximum allowable acceleration rate, either positive or negative, before some revolutions are not counted, or a single spurious pulse is incorrectly counted, is a function of the tire speed and the size of the circular buffer. Increasing the buffer size increases noise immunity and decreases the maximum allowable acceleration rate.

It should be appreciated that data analysis in addition to revolution counting may also be undertaken in accordance with aspects of the present subject matter. Additional analysis goals involve collection of other tire-related data and computation of relevant statistics for storage and later retrieval. For example, referring to FIG. 6, condition-responsive devices 90 and 92 may be provided in the tire electronics and coupled to microcontroller 42. It should be appreciated that any specific number of condition-responsive devices may be utilized and that such condition-responsive devices 90, 92 may correspond to components including but not limited to sensors, transducers, acoustic devices (e.g. saw devices), or other components that provide some sort of output in response to changes in input conditions associated with a tire or corresponding wheel assembly environment. Such condition-responsive devices can be used to monitor any number of tire or wheel characteristics, including but not limited to, temperature, pressure, number of tire revolutions, vehicle speed, or the level of three-dimensional static and dynamic forces (such as sidewall deflection or tire displacement) acting on or associated with tire structure. Environmental conditions monitored may include temperature and air pressure and tire or vehicle specific conditions such as rotational speed, total miles traveled, time/temperature relationships and other parameters.

The data obtained from condition-responsive devices 90, 92 may be utilized in conjunction with the determined revolution count as already described to provide more particular tire data analysis. For example, one or more condition-responsive device(s) may correspond to temperature and/or pressure sensor(s), thus providing a means to record the number of revolutions experienced at different temperature and/or pressure ranges. Considering the case of temperature, it should be noted that since revolutions at elevated temperatures tend to wear the tire out faster, information related to revolutions at various temperature ranges could be far more useful than a simple cumulative lifetime revolution count. This and other advanced analysis, further examples of which are discussed below, provide a significant advantage over conventional mechanical tire revolution counters.

Yet another example of more particular tire data analysis corresponds to determining the number of tire revolutions at various tire speeds. The speed of the tire can be determined by analyzing the electrical output of the piezoelectric patch versus time. Speed can be determined either by measuring the tire's period of rotation (time between pulses), by measuring the pulse frequency (pulses per unit time), or by measuring the pulse length. This provides a way to record the number of tire revolutions at different operating speeds, as well as to record operating time at various speeds, if desired.

Another example of advanced tire data analysis corresponds to determining tire revolutions with respect to tire deflection. Tire deflection can be determined by measuring the length of the tire's contact patch. The length of the contact patch can be determined by analyzing the electrical waveform from the piezoelectric strip. Additional details regarding exemplary technology for determining the amount of tire deflection of a pneumatic tire is disclosed in U.S. Pat. No. 5,749,984 (Frey et al.), which is incorporated by reference herein for all purposes. Information regarding tire deflection provides a means for recording the number of revolutions experienced at different deflection levels, the deflection being primarily influenced by load and pressure.

Many other types of information may be stored in the memory of microcontroller 42 for subsequent communication from a tire structure. For example, a product ID, which can uniquely identify a specific individual tire, can be included in stored data. Such an identification variable may be especially useful in tracking tires and vehicles in commercial applications such as trucking fleets, airplanes, etc. Identification variables can be used to assist in providing comprehensive tire description and analysis over the entire lifetime of respective tires, which may often be moved to different wheel positions or even different vehicles, and can be recapped several times.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A self-powered counter comprising:
   a generator responsive to movement and configured to produce a generator output signal, said generator output signal being characterized by pulses indicative of said movement;
   a power conditioner configured to receive said generator output signal and to produce a conditioned output voltage;
   a pulse detector configured to receive said generator output signal and to produce a detection signal having respective pulse indications upon any received pulse from said generator meeting a first predetermined criteria; and
   a microcontroller configured to receive operating power from said power conditioner and said detection signal from said pulse detector, said microcontroller further programmed to determine an accumulated value of selected pulse indications in said detection signal that meet a second predetermined criteria wherein the second predetermined criteria consists of meeting a predetermined time relationship between a predetermined number of successive pulses from said detection signal.

2. The self-powered counter of claim 1, wherein said generator comprises a piezoelectric device.

3. The self-powered counter of claim 1, wherein the first predetermined criteria is varied as a function of the output voltage of said power conditioner.

4. The self-powered counter of claim 1, wherein said microcontroller further comprises a circular buffer comprising at least n storage areas and wherein said microcontroller is further programmed so as to measure elapsed time between successive pulse indications from said pulse detector, to store n successive elapsed time measurements in said circular buffer, to compare a current elapsed time measurement (TC) to the maximum elapsed time measurement (TMAX) stored in said circular buffer, and to count as valid any pulse whose elapsed time measurement is greater than or equal to a predetermined fractional value of TMAX.

5. The self-powered counter of claim 4, wherein the predetermined fractional value of TMAX is TMAX/2.

6. The self-powered counter of claim 1, further comprising an RF transmission device coupled to said microcontroller for selectively relaying information stored in memory associated with said microcontroller to a remote location.

7. The self-powered counter of claim 1, further comprising at least one condition-responsive device for sensing environmental information related to temperature and/or pressure.

8. The self-powered counter of claim 1, wherein said microcontroller is further configured to determine revolution data relative to at least one secondary variable selected from the group consisting of temperature, pressure, time, and speed.

9. The self-powered counter of claim 1, further comprising a connection means coupled to said microcontroller for receiving information to be stored in memory associated with said microcontroller from a remote location.

10. A self-powered tire revolution counter, comprising:
    a piezoelectric element responsive to tire rotation and configured to produce a generator output signal, said generator output signal being characterized by pulses indicative of said tire rotation;
    a power conditioner configured to receive said generator output signal and to produce an output voltage;
    a pulse detector configured to receive said generator output signal and to produce a detection signal having respective pulse indications upon any received pulse in said generator meeting a first predetermined criteria; and
    a microcontroller configured to receive operating power from said power conditioner and the detection signal from said pulse detector, said microcontroller further programmed to determine an accumulated value of selected pulse indications in said detection signal that meet a second predetermined criteria wherein the second predetermined criteria consists of meeting a predetermined time relationship between a predetermined number of successive pulses from said detection signal.

11. The self-powered tire revolution counter of claim 10, wherein the first predetermined criteria is varied as a function of the output voltage of said power supply.

12. The self-powered tire revolution counter of claim 11, wherein said microcontroller further comprises a circular buffer comprising at least n storage areas and wherein said microcontroller is further programmed so as to measure elapsed time between successive signals from said pulse detector, to store n successive elapsed time measurements in said circular buffer, to compare a current elapsed time measurement (TC) to the maximum elapsed time measurement (TMAX) stored in said circular buffer, and to count as valid any pulse whose elapsed time measurement is greater than or equal to a predetermined fractional value of TMAX.

13. The self-powered tire revolution counter of claim 12, wherein said predetermined fractional value of TMAX is TMAX/2.

14. The self-powered tire revolution counter of claim 10, further comprising an RF transmitter coupled to said microcontroller for selectively relaying information stored in memory associated with said microcontroller to a remote location.

15. The self-powered tire revolution counter of claim 10, further comprising at least one condition responsive device for sensing information related to temperature and/or pressure.

16. The self-powered tire revolution counter of claim 10, wherein said microcontroller is further configured to determine tire revolution data relative to at least one secondary variable selected from the group consisting of temperature, pressure, time, speed, and tire deflection.

17. A pneumatic tire, comprising:
a tire structure characterized by a crown having an exterior tread portion, bead portions, exterior sidewall portions extending between each bead portion and the crown, and an inner liner along interior crown and sidewall surfaces; and
a self-powered tire revolution counter, comprising:
a generator responsive to tire rotation and configured to produce a generator output signal, said generator output signal being characterized by pulses indicative of said tire rotation;
a pulse detector configured to receive said generator output signal and to produce a detection signal having respective pulse indications upon any received pulse in said generator output signal meeting a first predetermined criteria; and
a microcontroller configured to receive the detection signal from said pulse detector, said microcontroller further programmed to determine an accumulated value of selected pulse indications in said detection signal that meet a second predetermined criteria wherein the second predetermined criteria consists of meeting a predetermined time relationship between a predetermined number of successive signals from said pulse generator.

18. The pneumatic tire of claim 17, wherein said generator comprises a piezoelectric device.

19. The pneumatic tire of claim 17, further comprising a power conditioner configured to receive said generator output voltage and to produce a conditioned output voltage for powering said microcontroller.

20. The pneumatic tire of claim 19, wherein the first predetermined criteria is varied as a function of the output voltage of said power supply.

21. The pneumatic tire of claim 17, wherein said microcontroller further comprises a circular buffer comprising n storage areas and wherein said microcontroller is further programmed so as to measure elapsed time between successive signals from said pulse detector, to store n successive elapsed time measurements in said circular buffer, to compare a current elapsed time measurement to the maximum elapsed time measurement (TMAX) stored in said circular buffer, and to count as valid any pulse whose elapsed time measurement is greater than or equal to TMAX/2.

22. The pneumatic tire of claim 17, wherein the self-powered tire revolution counter is secured to the inner liner of the tire.

23. The pneumatic tire of claim 17, wherein the self-powered tire revolution counter is cured within the tire structure.

24. A method for counting completed revolutions of a rotating element, the method comprising the steps of:
providing a generator configured to produce a signal pulse upon detection of a repeating predetermined condition;
measuring the elapsed time between first and second signal pulses to produce a current measured time value;
storing the current measured time value;
comparing the current measured time value with a predetermined fraction of a previously stored measured time value;
counting a detected pulse as representing a completed rotation if the current measured time value is greater than or equal to the predetermined fraction of a previously stored measured time value; and
repeating the steps of measuring, storing, comparing and counting to accumulate a total revolutions count for the rotating element.

25. The method of claim 24, wherein the step of comparing is applied to a predetermined fraction of the maximum time value of a predetermined most recent number of stored measured time values.

26. The method of claim 25, wherein the step of comparing is applied to a value of one half of the maximum time value of the predetermined most recent number of stored measured time values.

27. The method of claim 26, wherein the predetermined most recent number of stored measured time values is set equal to six.

28. The method of claim 24, wherein the current measured time value is stored in a circular buffer.

* * * * *